UNITED STATES PATENT OFFICE.

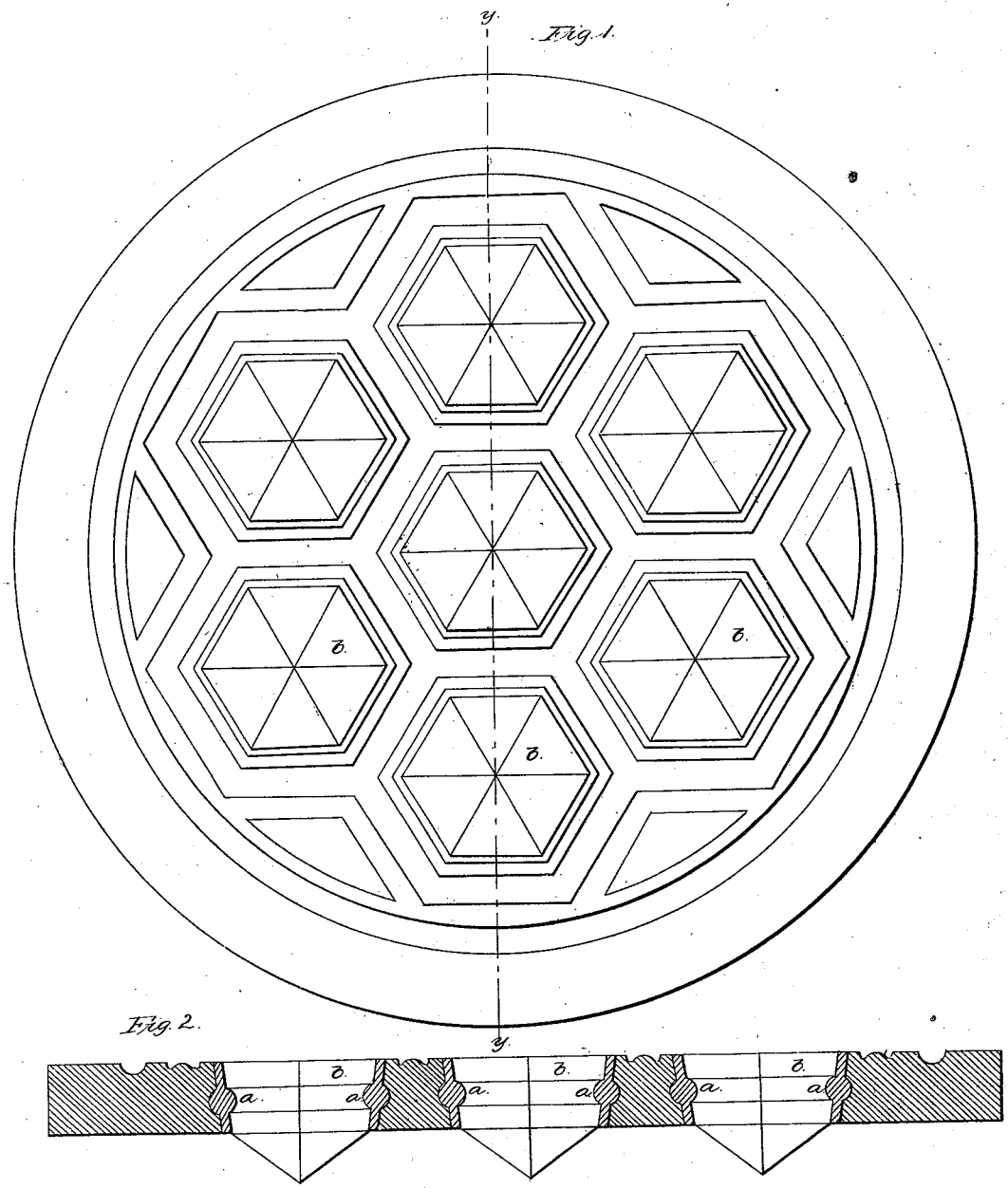

GEO. R. JACKSON, OF NEW YORK, N. Y.

ATTACHING THE GLASSES OF VAULT-COVERS.

Specification of Letters Patent No. 19,639, dated March 16, 1858.

*To all whom it may concern:*

Be it known that I, GEORGE R. JACKSON, of the city, county, and State of New York, have invented a new and useful Improvement in Illuminating Vault-Covers; and I do hereby declare that the following is a full and exact description thereof, reference being had to the accompanying drawings, making a part of this specification, Figure 1 being a top view of one of my improved illuminating vault-covers, and Fig. 2 a section in the line $y\ y$ of Fig. 1.

Manufacturers of illuminating vault-covers have heretofore found it nearly impossible to permanently secure the glasses within said covers. They have also found it impossible to secure tapering glasses within tapering apertures in such a manner as to prevent said glasses from settling below the upper surface of the metallic portion of their vault-covers, thereby rendering it necessary for them to support the glasses of their vault-covers on abrupt shoulders, which causes great numbers of said glasses to be fractured by the sharp blows to which they are constantly exposed.

The improvement in illuminating vault-covers which I now desire to secure by Letters Patent affords a perfect remedy to the aforesaid serious defects.

The apertures in the metallic portion of my improved illuminating vault-cover for the reception of the glasses are of a tapering shape and each of said apertures is surrounded by a groove of any suitable shape. The tapering peripheries of the glasses $b$, $b$, of the said cover, have grooves or channels $a$, $a$, formed in them, which may be of the shape represented in Fig. 2, or any other suitable shape.

The layers of cement which surround the glasses of any vault-cover, should be of such a thickness that they will keep the glass and metallic surfaces at a safe and suitable distance from each other; to wit, the said layers of cement must be thick enough to allow the said glasses to yield slightly when they are percussively acted upon. The said cement, which must be waterproof, will not adhere to smooth glass surfaces, but it will soon attain such a degree of hardness that my improved grooved glasses cannot be removed from their places in a vault-cover without fracturing them. The thick mass of cement which surrounds the periphery of each of the glasses in my improved vault-cover, it will readily be perceived will also prevent said glasses from being depressed below the upper surface of the metallic portion of said cover, while at the same time the said central mass of cement will act as a slightly elastic centralizing support to each glass embraced thereby, which will enable it to safely receive percussive blows that would fracture or displace vault-cover glasses secured in their places by any other known method.

The difference between the invention now sought to be secured by patent and the invention claimed as new in my last previous application for a patent, consists in this, viz., in the said former application the invention specifically set forth consisted in the channeling or grooving of the peripheries of vault-cover-glasses, without especial reference to any particular shape of the sides of the apertures that received said glasses, whereas the invention now sought to be secured by Letters Patent is the improvement produced by forming grooves in the tapering peripheries of vault-cover-glasses at the same time that grooves are formed in the inclined sides of the apertures that receive said glasses.

Having thus fully described my improvement in illuminating vault-covers, what I claim as my invention and desire to secure by Letters Patent, is—

The tapering and grooved glasses in combination with the tapering and grooved apertures in the metallic portions of said covers, substantially as shown and for the purposes described.

The above specification of my improvement in illuminating vault-covers, signed and witnessed this 31st day of January, 1858.

GEO. R. JACKSON.

Witnesses:
EDW. V. BURKE,
GEO. H. JACKSON.